US 6,659,706 B2

(12) United States Patent
English, Jr. et al.

(10) Patent No.: US 6,659,706 B2
(45) Date of Patent: Dec. 9, 2003

(54) LIFT DOLLY FOR USE IN CONJUNCTION WITH STAND-MOUNTED POWER TOOLS AND THE LIKE

(75) Inventors: Charles L. English, Jr., Havana, FL (US); Douglas R. Stahl, Tallahassee, FL (US); William A Hees, Monticello, FL (US)

(73) Assignee: Herculift Technologies, Inc., Havana, FL (US)

( * ) Notice: Subject to any disclaimer, the term of this patent is extended or adjusted under 35 U.S.C. 154(b) by 0 days.

(21) Appl. No.: 09/824,011

(22) Filed: Apr. 3, 2001

(65) Prior Publication Data

US 2001/0018016 A1 Aug. 30, 2001

Related U.S. Application Data

(60) Division of application No. 09/361,189, filed on Jul. 27, 1999, now abandoned, which is a continuation of application No. 08/880,864, filed on Jun. 23, 1997, now Pat. No. 5,957,649, which is a continuation-in-part of application No. 08/795,409, filed on Feb. 5, 1997, now Pat. No. 5,876,173.

(51) Int. Cl.[7] .................................................. B60P 3/00
(52) U.S. Cl. ........................ 414/458; 248/647; 414/495
(58) Field of Search ................. 414/444, 458, 414/476, 490, 495; 280/43.13, 79.11; 254/3 R, 3 C, 8 R, 8 C, 17, 120, 123; 248/647

(56) References Cited

U.S. PATENT DOCUMENTS

| 723,692 A | 3/1903 | Litsey |
| 1,092,220 A | 4/1914 | Koch et al. |
| 1,360,208 A | 11/1920 | Gamble et al. |
| 2,042,489 A | 6/1936 | Williams |
| 2,624,590 A | 1/1953 | Tilton |
| 2,696,928 A | 12/1954 | Faircloth et al. |
| 2,840,346 A | 6/1958 | Du Moulin |
| 2,937,850 A | 5/1960 | Winkler et al. |
| 3,179,438 A | 4/1965 | Field |
| 3,845,933 A | 11/1974 | Heizer, Jr. |
| 3,876,096 A | 4/1975 | Latek |
| 3,920,212 A | 11/1975 | Westwood |
| 4,113,235 A | 9/1978 | Hartman, Jr. |
| 4,334,669 A | 6/1982 | Ross |
| 4,362,458 A | 12/1982 | Jantzi |
| 4,533,117 A | 8/1985 | Schwang |
| 4,639,005 A | 1/1987 | Birkley |
| 5,018,930 A | 5/1991 | Hardin et al. |
| 5,029,814 A | 7/1991 | Liegel et al. |
| 5,131,501 A | 7/1992 | Yoshikawa |
| 5,232,203 A | 8/1993 | Butts |
| 5,299,817 A | 4/1994 | Chang |
| 5,464,315 A | 11/1995 | Palmer et al. |
| 5,615,451 A | 4/1997 | Peterson et al. |
| 5,628,522 A | 5/1997 | Hall |
| 6,311,992 B1 * | 11/2001 | Theising ..................... 414/458 |

FOREIGN PATENT DOCUMENTS

| CH | 368748 | 5/1963 |
| FR | 2604426 | 4/1988 |

OTHER PUBLICATIONS

Sears Caster, Jun. 1991.

* cited by examiner

Primary Examiner—James W. Keenan
(74) Attorney, Agent, or Firm—Liniak, Berenato & White

(57) ABSTRACT

A lift dolly is provided for lifting and transporting stand-mounted power tools and the like, with little effort. The dolly includes a pair of platforms and a wheel system having at least three castors extending downwardly from the platforms. The dolly is designed such that one step onto a latching or locking mechanism by the operator causes the wheel system to be forced downward relative to the stand thereby slightly lifting the power tool and stand off of the ground and enabling transport of same via the castors. Another step on the locking or latching mechanism disengages the wheel system and permits gravity to return the stand and tool firmly to the ground for use.

18 Claims, 4 Drawing Sheets

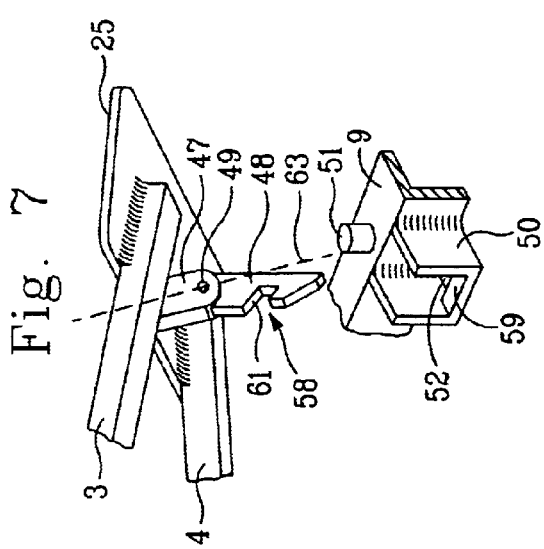
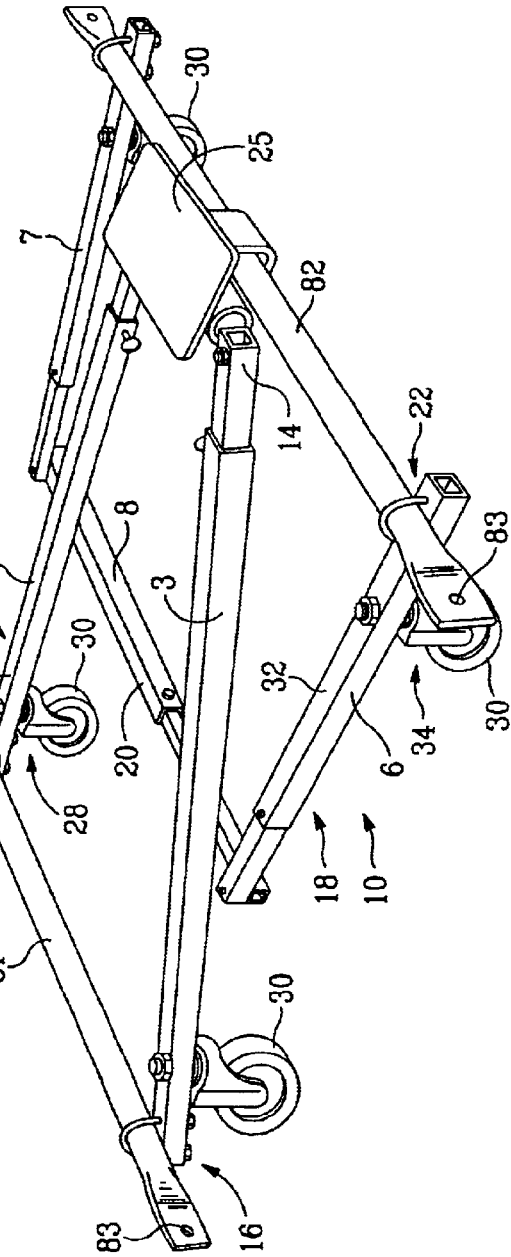
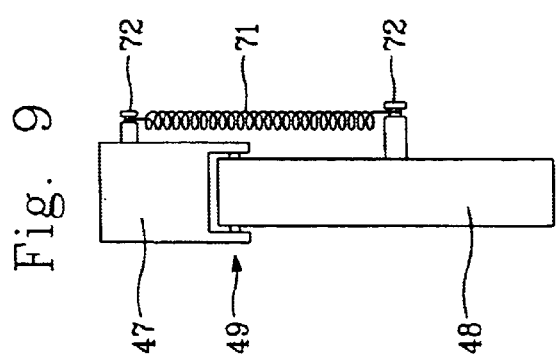

LIFT DOLLY FOR USE IN CONJUNCTION WITH STAND-MOUNTED POWER TOOLS AND THE LIKE

This application is a Divisional of Ser. No. 09/361,189, filed on Jul. 27, 1999, abandoned which is a Continuation of Ser. No. 08/880,864, filed on Jun. 23, 1997, now U.S. Pat. No. 5,957,649; which is a Continuation-in-Part (CIP) of Ser. No. 08/795,409, filed on Feb. 5, 1997, now U.S. Pat. No. 5,876,173, the disclosures of which are hereby incorporated herein by reference.

This invention relates to a lift dolly which is adapted to lift and transport stand-mounted power tools, and the like. More particularly, this invention relates to such a lift dolly which permits the operator to lift the tool to be transported by simply stepping onto a foot-receiving surface thereby forcing the dolly's wheel system downward relative to the tool and-into a position for supporting and transporting the stand-mounted tool.

BACKGROUND OF THE INVENTION

Lift dollies are old and well-known in the art. Dollies have been provided which function to lift and move bulky machinery, plate glass, and the like. In such dollies, a hand actuated hydraulic jack typically raises and lowers forks for lifting the machinery after which the dolly and machinery may together be rolled along the floor/ground by way of a pair of wheels mounted on the dolly.

Unfortunately, such dollies, while useful in transporting crates, plate glass, etc., are not adapted to lift and/or transport items such as stand-mounted power tools and the like due to the shape defined by legs of such stands.

In view of the above, it is apparent that there exists a need in the art for a lift dolly capable of lifting and transporting, with little effort, stand-mounted objects, such as power tools. Preferably, such a dolly should be simplistic, easy to use, and cost-effective to manufacture.

It is a purpose of this invention to fulfill the above-described needs in the art.

SUMMARY OF THE INVENTION

Generally speaking, this invention fulfills the above-described needs in the art by providing a lift dolly for lifting and transporting stand-mounted power tools and the like. In certain embodiments, the dolly includes a pair of rigid platforms and a wheel system having at least three, and preferably four, castors extending downwardly therefrom. The dolly is designed such that one step onto a foot receiving surface or member by the operator causes the wheel system to be forced downward relative to the tool and its stand, and locked in a tool-supporting position so as to slightly lift the power tool and stand off of the ground and enable transport of same. Another step by the operator on the foot-receiving surface disengages (i.e. unlocks/unlatches) the wheel system and permits gravity to return the stand and tool to the ground for use.

This invention further fulfills the above-described needs in the art by providing:

a dolly for selectively lifting and transporting a power tool mounted on a stand, the dolly comprising:
 a first platform including a wheel system (e.g. castors) extending downwardly therefrom, and an actuation surface or member for receiving downwardly applied pressure by an operator in order to lift the stand and tool off of the ground;
 a second platform including a wheel system extending downwardly therefrom;
 connection means for rigidly affixing the first platform to one portion of the stand, and means for rigidly affixing the second platform to another portion of the stand;
 the actuation surface or member of the first platform being located above at least a portion of the second platform; and
 lift means for lifting the stand and power tool off of the ground and enabling transport of same via the wheels, the lift means including a selectively actuated coupling means (e.g. latch) for selectively coupling the first and second platforms, and being actuated in response to pressure applied downwardly onto the actuation surface or member that forces the wheels downward so that the wheels, as opposed to the stand, support the power tool on the ground.

IN THE DRAWINGS

FIG. 7 is a perspective view of the latching/locking system used to connect the first and second dolly platforms of FIGS. 1–6.

FIG. 8 is a perspective view of a dolly according to another embodiment of this invention.

FIG. 9 is a rear elevational view of part of the FIG. 7 latching mechanism, illustrating the attachment of the biasing spring to the male latch member.

DETAILED DESCRIPTION OF CERTAIN EMBODIMENTS OF THIS INVENTION

Figure 1:
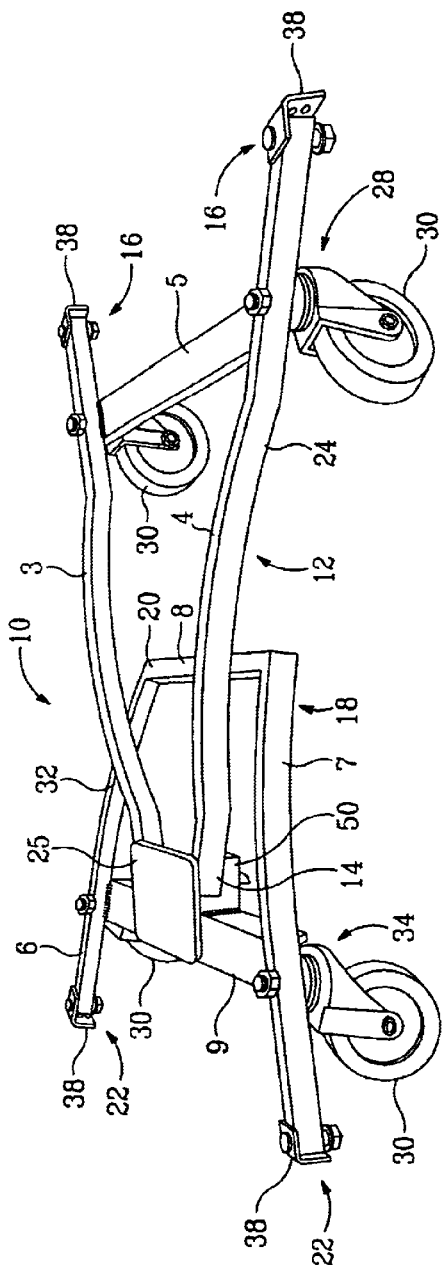
FIG. 1 is a perspective view of the lift dolly according to an embodiment of this invention, in its locked/lifting position.
Figure 2:
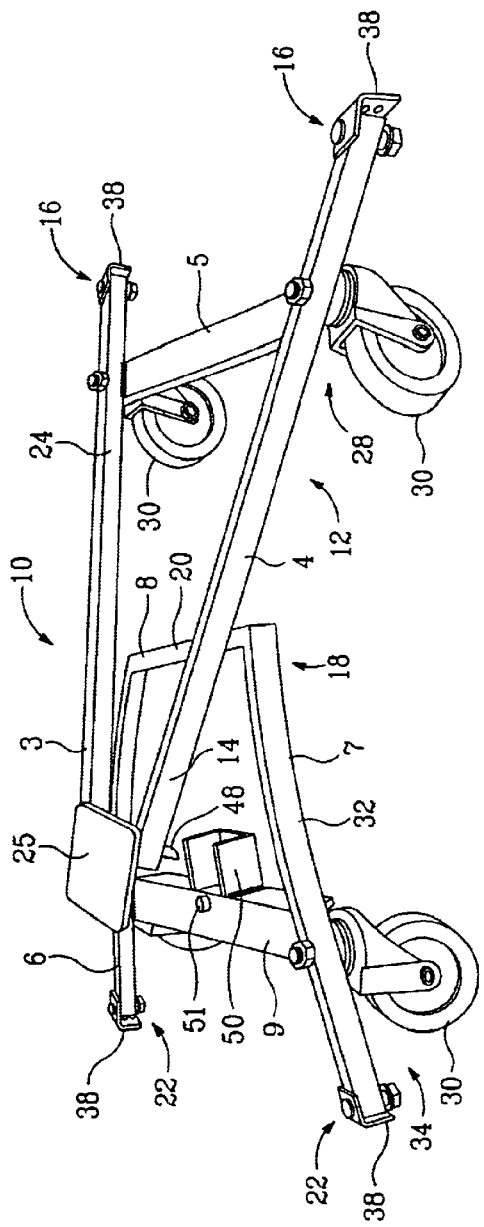
FIG. 2 is a perspective view of the FIG. 1 dolly in its unlocked/lowering position.
Figure 3:
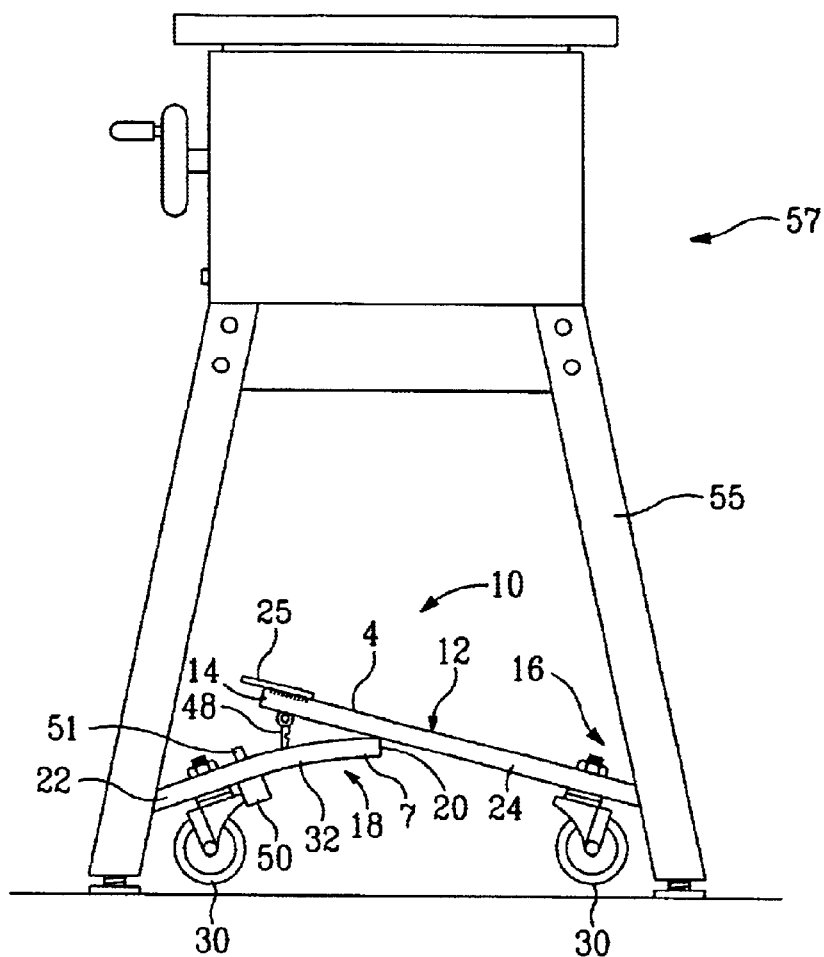
FIG. 3 is a right side elevational view of the dolly of FIGS. 1–2 mounted to a stand which supports a table saw, the dolly being illustrated in the unlocked position where the stand solely supports the saw.

Referring now more particularly to the accompanying drawings in which like reference numerals indicate like parts throughout the several views.

Referring to FIGS. 1–7, it is seen that the lift dolly of the present invention, generally denoted by reference numeral 10, includes first rigid platform 12 having proximal end 14 and distal end 16 and second rigid platform 18 having proximal end 20 and distal end 22. First platform 12 includes generally flat, triangular, and trapezoidal frame portion 24, including rigid elongated members 3–5, that may be open (as illustrated) or closed (e.g. a solid or quasi-solid metal sheet or the like). The wheel system of first platform 12 may include, for example, a first pair of castor stems 28, each having a castor 30 thereon, which extend downwardly from frame 24 proximate distal end 16 of platform 12. Alternatively, other types of known wheels may be used in place of castors 30 to support lift dolly 10.

For example, the wheel system of each platform may simply include a single elongated rotating cylinder [instead of the illustrated castors], so that only two wheels are provided on the entire device. It should be noted, however, that according to this cylinder-inclusive embodiment, the dolly would only be mobile in one direction as opposed to all directions [this is, of course, acceptable in certain embodiments of this invention].

Referring to FIGS. 1, 2, 7, and 9, platform 12 further includes, as part of the latching mechanism, foot receiving surface or pedal 25 mounted on top of respective ends of members 3 and 4, downwardly extending male portion 48 of the latching mechanism that is pivotally mounted below surface 25, mounting member 47 affixed to one of members 3 or 4 (or to plate 25), and pivot axis 49 about which male portion 48 pivots relative to mounting member 47.

Second platform 18 is smaller in size than platform 12, and includes generally flat, triangular, and trapezoidal frame portion 32, that includes rigid elongated members 6–9. Frame 32 may be open (as illustrated) or closed. A second pair of castor stems 34, each having a castor 30 thereon, extend downwardly from frame 32 proximate distal end 22 and crossbar 9 thereof.

Platform 18 further includes, as part of the latch/lock assembly, rigid U-shaped member 50 that projects from the inner vertical surface of crossbar 9, vertically extending projection or cam surface 51 that extends from the upper horizontal surface of crossbar 9, latching aperture or void 52 (see FIG. 7) defined in the bottom surface of U-shaped member 50, and locking crossbar 59 which locks the latching mechanism by fitting into cutout or notch 58 of male member 48. Although the cam surface is defined by projection 51 in the illustrated embodiments, this surface may be defined by other portions of platform 18 or the female portion of the latching mechanism.

With regard to platforms 12, 18, and frames 24, 32 thereof, the platforms illustrated in FIGS. 1–8 are open (i.e. they are made up of the frame, which includes a plurality of rigid members connected to one another at corners of the frame). However, it will be appreciated by those of skill in the art that platforms 12 and 18 (as well as frames 24 and 32) may be of any of a number of different shapes or designs, provided that the essential function of the dolly is not compromised. For example, each platform may be made up of a planar or arced sheet of rigid material (e.g. sheet metal) that is void of any elongated frame members. Furthermore, it will be appreciated that the illustrated and discussed latching mechanism is exemplary and the invention is not limited thereto. Other known latching mechanisms which permit selective attachment of the platforms may instead be used.

Mounting members (or anchor plates) 38 are attached to the four corners of dolly 10 for the purpose of affixing the dolly to the four legs of the stand 55 which supports an item such as power tool 57 (e.g. table saw). Other power tools such as drills, lathes, etc. may also be mounted on stand 55, as may objects other than power tools. For example, it has further been found that the dolly 10 can be advantageously used in connection with or built into a wide variety of other devices such as tables, workbenches, medical equipment, chairs, engine lifts, filing cabinets, copiers and other office equipment to facilitate lifting and/or transport thereof. Each mounting member 38 is pivotally attached to the corresponding platform and/or frame and is rotatable about a vertical axis so that the platforms may be mounted to different sides of legs of different sized stands 55.

In order to utilize lift dolly 10 to perform its intended function, first platform 12 is positioned proximate an object 55, 57 (e.g. stand-mounted power tool) to be lifted. Each mounting member or anchor plate 38 is secured to a different leg of object 55, 57. This securement can be accomplished in any appropriate fashion, including insertion of bolts attached to plates 38 through corresponding apertures defined in the legs of stand 55.

Once anchor plates 38 of platform 12 are secured to object 55, 57, the weight of the object causes first platform 12 to be oriented so that castors 30 merely rest on the ground without supporting the object (i.e. while the wheels 30 may touch the ground or be slightly raised therefrom, the stand may not be moved as the legs are the primary tool support, and use of the tool is unaffected). See FIG. 3.

Second platform 18 is secured to the other end of object 55, 57 to be lifted in a similar fashion to the securement of first platform 12 to object 55, 57 (i.e. platform 12 is attached to first and second legs of stand 55, while platform 18 is attached to third and fourth legs of the stand). When second platform 18 is secured, it is oriented with its proximal end 20 terminating beneath first platform 12. See FIG. 3.

In order to lift object 55, 57 off of the ground in order to move it via the dolly, downward pressure is exerted by an operator or user (preferably by the foot of the operator) on foot-receiving surface or platform 25 proximate end 14 of frame 24. When end 14 of platform 12 is pressed downward, spring-biased male portion 48 is inserted through aperture 52 (see FIG. 7) of the latch's female portion, with the spring-bias then causing the latching mechanism to lock the two platforms 12 and 18 together as cutout or notch 58 in male 48 receives locking member or crossbar 59 due to the biasing of male 48 toward locking member 59 by spring 71 (see FIG. 9).

Figure 4:
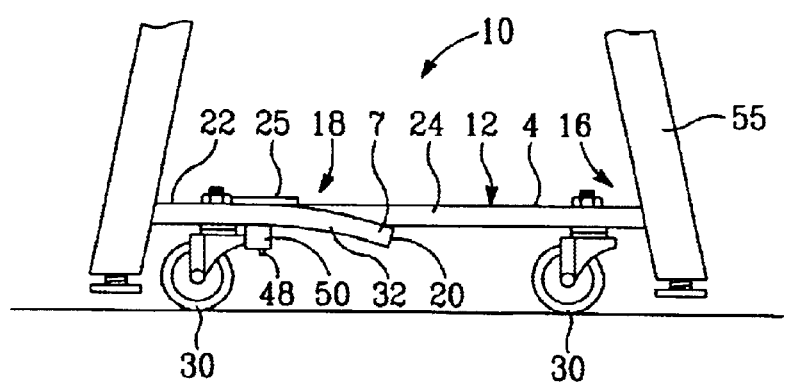
FIG. 4 is a fragmentary right side elevational view of the dolly of FIGS. 1–3 mounted to the table saw stand of FIG. 3, the dolly illustrated in the locked position where the table saw and stand are supported on the ground by the wheels so as to enable transport.
Figure 5:
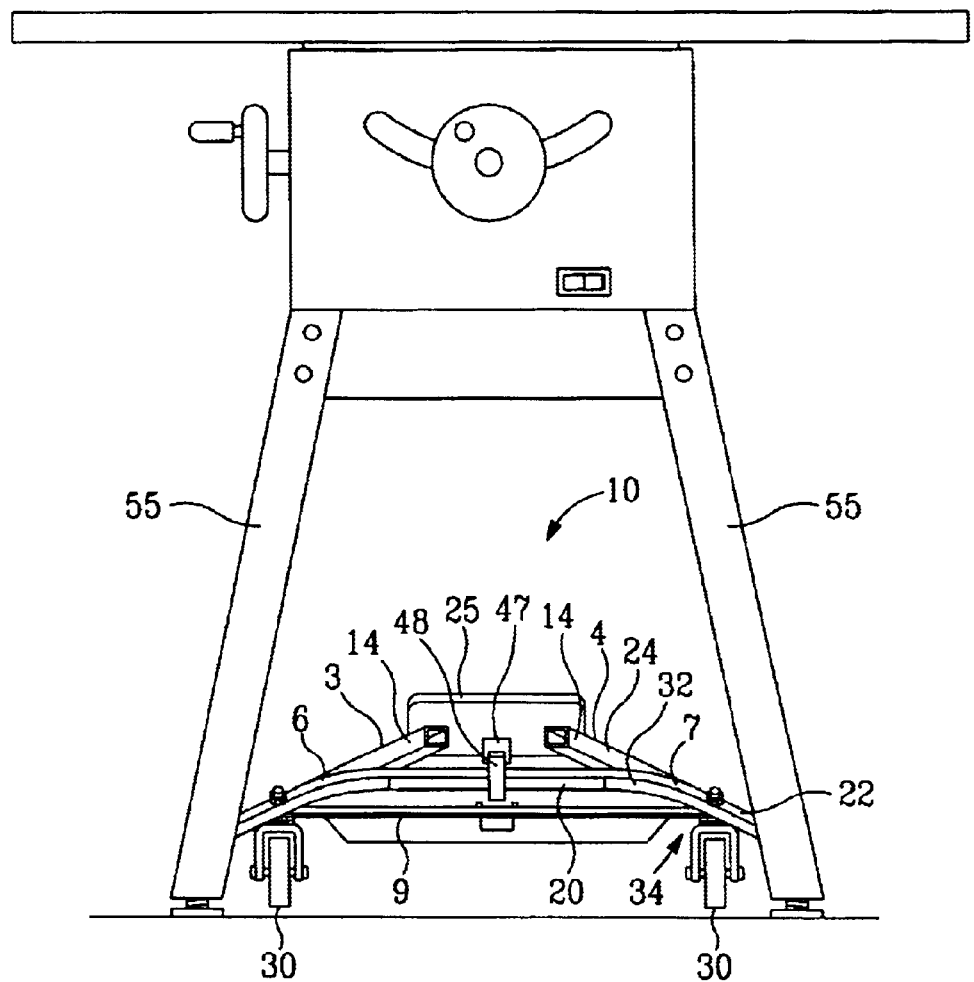
FIG. 5 is a front elevational view of the FIGS. 1–4 dolly mounted to the stand, illustrating the dolly in its unlocked position where the stand contacts the ground.
Figure 6:
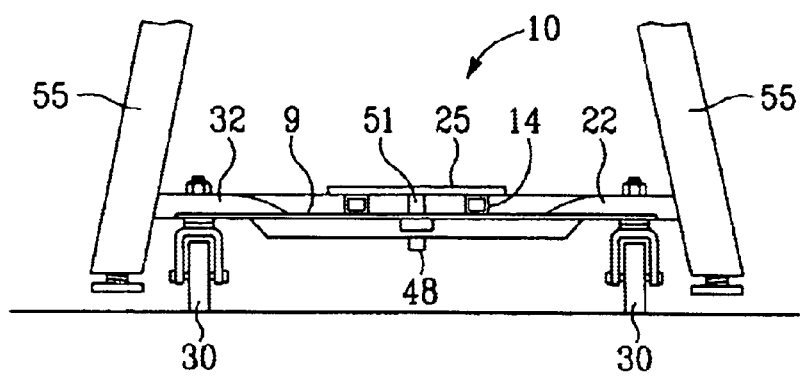
FIG. 6 is a fragmentary front elevational view of the FIGS. 1–5 dolly mounted to the stand, illustrating the dolly in its locked and lifting position where the stand is lifted from the ground and the stand and saw are supported on the ground primarily by the wheels.

When crossbar 59 is locked in notch 58, castors 30 of both platforms have been forced downward and are held there contacting the ground in a supporting manner as shown in FIGS. 4 and 6, thereby lifting stand 55 and tool 57 off of the ground so that they can be wheeled across the ground and transported. As discussed, when rigid platform 12 is forced downward by the operator, elongated members 3 and 4 engage end 20 and crossbar 8 of second platform 18 thereby causing downward movement of frame 32 relative to the stand, and thus castors 30 of platform 18 also become supportive of the stand and tool as shown in FIGS. 4 and 6. When the first and second platforms are generally horizontal (e.g. see FIGS. 4 and 6), the stand and tool are lifted off of the ground by all four wheels or castors and are ready for lateral transport on the ground.

It is noted that the first pair of castor stems 28 may be longer than the second pair of castor stems 34 in order to assure level positioning of dolly 10, or alternatively one or both of frames 24 and 32 may be bent or curved to accomplish the same result.

In certain embodiments, platforms 12 and 18 are not secured to one another in any fashion, except via the legs of the stand, and by latch mechanism 47, 48, 49, 50, 51, 52, and 59 when it is locked. Thus, when dolly 10 is in its passive or non-lifting position (see FIGS. 2, 3, and 5), the two platforms are not directly connected together in certain embodiments, although the bottom surfaces of members 3 and 4 rest upon the top of crossbar 8 of platform 18, and the legs of stand 55 indirectly couple the platforms.

When the operator presses down on surface 25, male 48 becomes locked within the female portion 50, 52, 59 of the latch mechanism thereby locking the wheels or castors in their supporting position and, at the same time, coupling the two platforms (see FIGS. 7 and 9 for a detailed view of the latch mechanism). When the wheels are in a supportive position and the latch is locked thereby coupling the platforms together, stand 55 and tool 57 may be rolled along the ground and transported.

In certain alternative embodiments, platforms 12 and 18 may be attached to one another at a location in addition to the latching mechanism (e.g. at bar 8). However, regardless of whether the platforms are additionally attached, they are to be selectively coupled via the latching mechanism.

FIG. 9 illustrates the attachment of biasing spring 71 to mounting member 47 and male member 48 of the latching mechanism. Pins 72 are provided for attaching spring 71 to these members so that spring 71 biases member 48 toward crossbar 59 when the center of gravity of member 48 is on the crossbar 59 side of axis 63, and away from crossbar 59 when the center of gravity of the male member is on the other side of axis 63.

Referring to FIG. 7, when it is desired to lower the stand and tool from its lifted position, the operator simply steps on surface 25 in order to release the latch and allow gravity to lower the stand and tool to the ground for use. When the operator steps on surface 25 when the latch is locked, male portion 48 is caused to move further downward through aperture 52 in a manner so that upwardly angled surface 61 of member 48 slides along the inner surface of crossbar 59. The sliding of angled surface 61 of member 48 along crossbar 59 causes male member 48 to pivot about axis 49 in a direction away from crossbar 59 and to the opposite side of axis 63 that extends through each of members 47 and 48 and axis 49.

When male member 48 reaches the other side of axis 63, the spring causes member 48 to be biased in the opposite pivotal direction (i.e. away from crossbar 59 as viewed in FIG. 7) so that when the operator lifts his/her foot off of surface 25, stand 55 falls to the ground as male member 48 moves upwardly through aperture 52 and is biased away from crossbar 59. On its way upward away from aperture 52 and crossbar 59 during the release/unlocking process, the side of member 48 opposite cutout 58 contacts projection (or cam surface) 51 which causes member 48 to move back to the crossbar 59 side of axis 63 so that when male member 48 is again pressed downward through aperture 52, the spring will bias member 48 toward crossbar 59 which will come to rest within cutout 58 thereby locking together the platforms of the dolly with the stand and tool in the raised or lifted position.

FIG. 8 illustrates dolly 10 according to another embodiment of this invention. This embodiment is different than the previously described embodiment(s) in that anchor plates 38 are replaced with crossbar members 81 and 82 which are part of frames 24 and 32, respectively. The two platforms are attached to the four legs of stand 55 by way of crossbars 81–82, and the mounting apertures 83 defined therein. Bolts are fed through apertures 83 and the stand legs in order to mount the dolly to the stand. Furthermore, all other elongated members (3, 4, 6, 7, and 8) of the frames or platforms are telescopic in this embodiment in order to allow the dolly to mount onto different sized stands 55 and tools 57. Thus, these telescopic elongated members each include an inner elongated member and an outer elongated member which are axially adjustable relative to one another in order to alter the lengths of members 3, 4, 6, 7, and 8.

Once given the above disclosure, therefore, various other modifications, features, or improvements will become apparent to the skilled artisan. Such other features, modifications, and improvements are thus considered to be a part of this invention, the scope of which is to be determined by the following claims.

I claim:

1. A dolly for selectively lifting, transporting from a first location to a second location, and lowering a power tool mounted on a stand having four legs, the dolly comprising:
   a first platform including a first wheel system extending downwardly therefrom, said first platform adapted to be pivotally connected to a first leg and a second leg of a stand upon which a power tool is mounted, wherein said first leg and said second leg are adjacent;
   a second platform having a proximal end and a distal end and including a second wheel system extending downwardly from said distal end, said second platform adapted to be pivotally connected to a third leg and a fourth leg of said stand and further including a pivot point, wherein said third leg and said fourth leg are adjacent;
   a lever portion of said first platform at least partially extending across and overlying said pivot point and said proximal end of said second platform wherein said proximal end of said second platform terminates beneath said first platform, said lever portion being rigidly fixed against rotational and translational movement with respect to said first platform;
   a selectively actuated coupling means for selective locking at least one of said first and second platforms in a lift position with respect to the stand;
   wherein said dolly is selectively moved by a pressure applied to said lever portion between a first passive position where the four legs of said stand rest on the ground to a second lift position where the four legs of said stand are lifted off of the ground thereby enabling the stand to be raised and moved on the ground from said first location to said second location via said wheel systems, and wherein said stand is lowered by said dolly back to said first passive position wherein the four legs of said stand rest on the ground in said second location.

2. The dolly of claim 1, wherein said first platform comprises at least a first pair of rigid elongated members, at least one rigid traversing member extending between said first pair of rigid elongated members, said first pair of rigid elongated members defining said lever portion.

3. The dolly of claim 2, wherein said first platform further includes an actuation member for receiving a downwardly applied pressure in order to lift the stand and tool off of the ground into said second lift position, said actuation member being disposed adjacent a terminal end of said first pair of rigid elongated members.

4. The dolly of claim 1, wherein said second platform comprises at least a second pair of rigid elongated members, at least one transverse pivot member extending between said second pair of rigid elongated members, said transverse pivot member defining said pivot point.

5. The dolly of claim 4, wherein said first platform engages and pivots about said at least one transverse pivot member when said dolly is moved between said first passive position to said second lift position said first platform.

6. A dolly for selectively lifting, transporting from a first location to a second location, and lowering a power tool mounted on a stand having four legs, wherein said dolly is in a first passive position when the stand is resting on the ground, and is in a second lift position when the stand is raised off the ground, the dolly comprising:

a first platform comprising a frame portion, a lever portion connected to said frame portion and rigidly fixed against rotational and translational movement with respect to said frame portion, a first wheel system extending downwardly from said frame portion, and a first mounting member and a second mounting member each pivotally attached to said first platform and rotatable about a vertical axis, wherein said first mounting member is adapted to be selectively secured to a first leg of a stand upon which a power tool is mounted and wherein said second mounting member is adapted to be selectively secured to a second leg of the stand upon which a power tool is mounted;

a second platform comprising a frame portion, a pivot point connected to said frame portion, a second wheel system extending downwardly from said frame portion, and a a third mounting member and a fourth mounting member each pivotally attached to said second platform and rotatable about a vertical axis, wherein said third mounting member is adapted to be selectively secured to a third leg of said stand and said fourth mounting member is adapted to be selectively secured to a fourth leg of said stand, wherein said lever portion of said first platform at least partially extends across and overlies said pivot point of said second platform;

wherein said dolly is selectively moved by a pressure applied to said lever portion between a first passive position where the four legs of said stand rest on the ground to a second lift position where the four legs of said stand are lifted off of the ground thereby enabling the stand to be raised and moved on the ground from said first location to said second location via said wheel systems, and wherein said stand is lowered by said dolly back to said first passive position to rest on the ground in said second location.

7. The dolly of claim 6, further comprising a selectively actuated coupling means for selective locking at least one of said first and second platforms in said second lift position with respect to the stand.

8. The dolly of claim 7, wherein said selectively actuated coupling means is a latch.

9. The dolly of claim 6, wherein said frame portion of said first platform is bent or curved.

10. The dolly of claim 6, wherein said frame portion of said second platform is bent or curved.

11. The dolly of claim 6, further comprising spacing means for spacing said first wheel system of said first platform, wherein said first wheel system extends a greater distance from said first platform than said second wheel system extends from said second platform, so as to assure level positioning of said dolly.

12. The dolly of claim 6, wherein said frame portion of said first platform is adjustable in length.

13. The dolly of claims 6, wherein said frame portion of said second platform is adjustable in length.

14. A movable power tool mounted on a stand comprising:

a stand having four legs;

a power tool mounted thereon; and a dolly for selectively lifting, transporting from a first location to a second location, and lowering the power tool mounted on a stand, the dolly comprising:

a first platform including a first wheel system extending downwardly therefrom, a lever portion rigidly fixed against rotational and translational movement with respect to said first platform, and means for pivotally connecting said first platform to a first leg and a second leg of the stand, wherein said first leg and said second leg are adjacent;

a second platform including a second wheel system extending downwardly therefrom, a pivot point, and means for pivotally connecting said second platform to a third leg and a fourth leg of the stand, wherein said third leg and said fourth leg are adjacent and wherein said lever portion of said first platform at least partially extends across and overlies said pivot point of said second platform; and a selectively actuated coupling means for selective locking at least one of said first and second platforms in a lift position with respect to the stand;

wherein said dolly is selectively moved by a pressure applied to said lever portion between a first passive position where the four legs of said stand rest on the ground to a second lift position where the four legs of the stand are lifted off of the ground thereby enabling the stand to be raised and moved on the ground from said first location to said second location via said wheel systems, and wherein said stand is lowered by said dolly back to said first passive position wherein said four legs of the stand rest on the ground in said second location.

15. The moveable stand mounted power tool of claim 14, wherein said first platform comprises at least a first pair of rigid elongated members, at least one rigid traversing member extending between said first pair of rigid elongated members, said first pair of rigid elongated members defining said lever portion.

16. The moveable stand mounted power tool of claims 15, wherein said first platform further includes an actuation member for receiving a downwardly applied pressure in order to lift the stand and tool off of the ground into said second lift position, said actuation member being disposed adjacent a terminal end of said first pair of rigid elongated members.

17. The moveable stand mounted power tool of claim 14, wherein said second platform comprises at least a second pair of rigid elongated members, at least one transverse pivot member extending between said second pair of rigid elongated members, said transverse pivot member defining said pivot point.

18. The moveable stand mounted power tool of claim 17, wherein said first platform engages and pivots about said pivot point when said dolly is moved between said first passive position to said second lift position.

\* \* \* \* \*